United States Patent
Granados Asensio et al.

(10) Patent No.: US 10,967,579 B2
(45) Date of Patent: Apr. 6, 2021

(54) DATA UNITS FOR ADDITIVE MANUFACTURING

(71) Applicants: HEWLETT-PACKARD DEVELOPMENT COMPANY, L.P., Houston, TX (US); Vicente Granados Asensio, Sant Cugat del Valles (ES); Emilio Lopez Matos, Sant Cugat del Valles (ES); Ismael Chanclon Fernandez, Sant Cugat del Valles (ES); Jorge Castano Aspas, Sant Cugat del Valles (ES); Salvador Sanchez Ribes, Sabadell (ES); Luis Garcia Garcia, Les Roquetes (ES); Carmen Blasco, Barcelona (ES)

(72) Inventors: Vicente Granados Asensio, Sant Cugat del Valles (ES); Emilio Lopez Matos, Sant Cugat del Valles (ES); Ismael Chanclon Fernandez, Sant Cugat del Valles (ES); Jorge Castano Aspas, Sant Cugat del Valles (ES); Salvador Sanchez Ribes, Sabadell (ES); Luis Garcia Garcia, Les Roquetes (ES); Carmen Blasco, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/071,560

(22) PCT Filed: May 12, 2016

(86) PCT No.: PCT/EP2016/060700
§ 371 (c)(1),
(2) Date: Jul. 20, 2018

(87) PCT Pub. No.: WO2017/194123
PCT Pub. Date: Nov. 16, 2017

(65) Prior Publication Data
US 2019/0077084 A1     Mar. 14, 2019

(51) Int. Cl.
*B29C 64/386* (2017.01)
*H04L 29/06* (2006.01)
(Continued)

(52) U.S. Cl.
CPC .......... *B29C 64/386* (2017.08); *B29C 64/255* (2017.08); *B33Y 30/00* (2014.12);
(Continued)

(58) Field of Classification Search
CPC ..... B29C 64/255; B29C 64/386; B33Y 30/00; B33Y 50/00; H04L 63/0428; H04L 63/06; H04L 63/08; H04L 63/0853
See application file for complete search history.

(56) References Cited

U.S. PATENT DOCUMENTS

| 7,037,382 B2 | 5/2006 | Davidson et al. |
| 9,233,504 B2 | 1/2016 | Douglas et al. |

(Continued)

FOREIGN PATENT DOCUMENTS

| CN | 104203547 | 12/2014 |
| CN | 204036857 | 12/2014 |

(Continued)

OTHER PUBLICATIONS

Sanogo; "Secure 3D Printing—the New Disruptive Technology—and Watch the Market Grow"; Apr. 22, 2015; https://www.maximintegrated.com/en/app-notes/index.mvp/id/5940.

*Primary Examiner* — Chad G Erdman
(74) *Attorney, Agent, or Firm* — HP Inc. Patent Department

(57) ABSTRACT

In an example, a data unit includes a mounting to removably mount the data unit on a receiving portion of an additive (Continued)

manufacturing build material container, a data source to provide data comprising a plurality of additive manufacturing parameters and a communications interface to communicate with a reader of an additive manufacturing build material processing apparatus. The communications interface is to transmit data from the data source to the additive manufacturing build material processing apparatus.

21 Claims, 5 Drawing Sheets

(51) Int. Cl.
*B33Y 30/00* (2015.01)
*B33Y 50/00* (2015.01)
*B29C 64/255* (2017.01)

(52) U.S. Cl.
CPC .......... *B33Y 50/00* (2014.12); *H04L 63/0428* (2013.01); *H04L 63/06* (2013.01); *H04L 63/08* (2013.01); *H04L 63/0853* (2013.01)

(56) References Cited

U.S. PATENT DOCUMENTS

| | | | |
|---|---|---|---|
| 2006/0087678 A1* | 4/2006 | Simpson | G06F 21/34 358/1.15 |
| 2006/0091199 A1 | 5/2006 | Loughran | |
| 2006/0127153 A1* | 6/2006 | Menchik | B29C 64/40 400/62 |
| 2009/0187766 A1* | 7/2009 | Vuillaume | G06F 21/33 713/176 |
| 2011/0121476 A1 | 5/2011 | Batchelder | |
| 2012/0276233 A1* | 11/2012 | Napadensky | B29C 64/386 425/145 |
| 2013/0285798 A1* | 10/2013 | Koike | G06K 7/10009 340/10.51 |
| 2014/0117585 A1 | 5/2014 | Douglas | |
| 2016/0023863 A1* | 1/2016 | Martin | G01D 5/3473 242/563.2 |
| 2016/0068793 A1* | 3/2016 | Maggiore | B29C 64/227 435/289.1 |
| 2016/0350526 A1* | 12/2016 | Youngquist | H04L 9/0625 |
| 2018/0178452 A1* | 6/2018 | Costabeber | B29C 64/259 |

FOREIGN PATENT DOCUMENTS

| | | |
|---|---|---|
| CN | 104723564 | 6/2015 |
| CN | 1946356 | 4/2017 |
| GB | 2485863 | 5/2012 |
| WO | WO-2015185155 | 12/2015 |

\* cited by examiner

DATA UNITS FOR ADDITIVE MANUFACTURING

BACKGROUND

Additive manufacturing techniques such as three-dimensional (3D) printing relate to techniques for making 3D objects of almost any shape from a digital 3D model through additive processes in which 3D objects are generated on a layer-by-layer basis under computer control. A large variety of additive manufacturing technologies have been developed differing in build materials, deposition techniques and processes by which the 3D object is formed from the build material. Such techniques may range from applying ultra-violet light to photopolymer resin, to melting semi-crystalline thermoplastic materials in powder form, to electron-beam melting of metal powders.

Additive manufacturing processes may begin with a digital representation of a 3D object to be manufactured. This digital representation may be virtually sliced into layers by computer software or may be provided in pre-sliced format. Each layer represents a cross-section of the object to be manufactured, and is sent to an additive manufacturing apparatus (also termed a "3D printer") where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where it needs to be transferred to the building area or building compartment of the additive manufacturing apparatus where the actual manufacturing takes place.

DRAWINGS

DESCRIPTION

Figure 1:
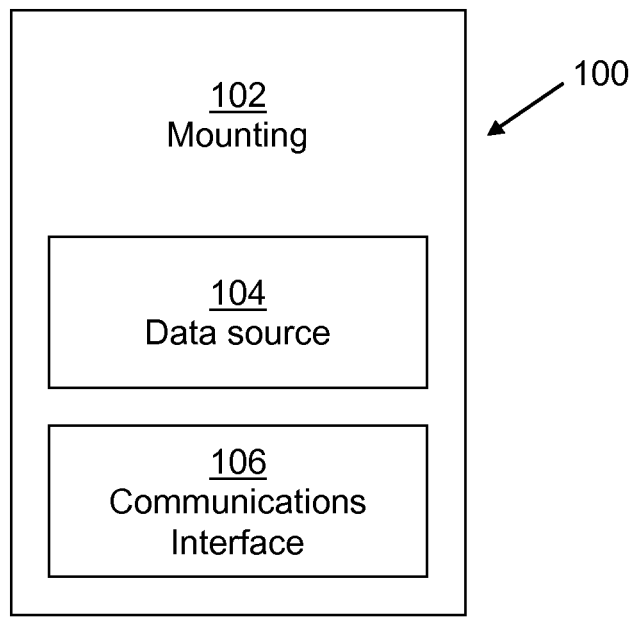
FIG. 1 is a schematic drawing of an example data unit.

Three-dimensional objects can be generated using additive manufacturing techniques. The objects may be generated by solidifying portions of successive layers of build material. The build material can be powder-based and the properties of generated objects may be dependent on the type of build material and the type of solidification. In some examples, solidification of the powder material is enabled using a liquid fusing agent. In further examples, solidification may be enabled by temporary application of energy to the build material. In certain examples, fusing and/or bind agents are applied to build material, wherein a fusing agent is a material that, when a suitable amount of energy is applied to a combination of build material and fusing agent, causes the build material to fuse and solidify. In other examples, other build materials and other methods of solidification may be used. In certain examples, the build material includes paste material, slurry material or liquid material.

In one example the build material in the source container is powder that has an average volume-based cross sectional particle diameter size of between approximately 5 and approximately 400 microns, between approximately 10 and approximately 200 microns, between approximately 15 and approximately 120 microns or between approximately 20 and approximately 80 microns. Other examples of suitable, average volume-based particle diameter ranges include approximately 5 to approximately 80, or approximately 5 to approximately 35 microns. In this disclosure a volume-based particle size is the size of a sphere that has the same volume as the powder particle. With "average" it is intended to imply that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 90 microns using build material containers that contain powder having average volume-based particle diameters of between approximately 40 and approximately 60 microns. For example the additive manufacturing apparatus can be reset to distribute different layer thicknesses.

Suitable powder-based build materials for the container of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends.

In additive manufacturing, it may be the case that build materials become heated. For example, where fusing agents are applied and caused to absorb energy, this tends to heat the build material, in particular in the regions to which fusing agents have been applied. In addition, some additive manufacturing processes may pre-heat build materials, or may comprise exothermic chemical reactions or the like. In such processes, there is a possibility of build material overheating, for example to the point where it could damage apparatus or even ignite.

Different build materials may be associated with different processing temperatures. For example, different materials may have different melting points, or different flash points (the flash point is the temperature at which a build material may evaporate to such an extent that the vapour may ignite). In addition, different temperatures may result in different physical properties of an object, such as object strength, resilience, appearance or the like.

A particular additive manufacturing apparatus may be intended to be used with a range of such materials and therefore may comprise settings (temperature settings, layer processing times, etc.) which are matched to the build material being processed thereby. If too high a temperature is reached during object generation for a particular build material, there are risks, which may include an object failing to be manufactured as intended, damage to equipment, and/or the possibility of explosions and/or fire. In some examples, the additive manufacturing apparatus may be arranged for operation with a particular build material or range thereof, and attempting to manufacture an object using a different build material may result in similar risks.

In addition to considering careful handling of individual build materials, consideration may be made in relation to mixtures of build material, even at a trace level. For example, a poorly considered mixture may result in failure to manufacture an object as intended, as different melting temperatures may mean that some material within the mixture melts and other does not, or some material may overheat. In other examples, the object may have unintended properties as a result of a poorly considered mixture. Moreover, different build materials may react adversely with one another, for example when heat is applied (for example, when the build material is molten or in a vapour state). Again, there may be risks of damage to apparatus, infrastructure or personnel.

In examples set out herein, a supply of build material may be associated with a data source providing at least one additive manufacturing parameter, which may be or include a build material parameter (e.g. describing an aspect or attribute of the build material), or an authorisation parameter, which may play a part in an 'authorisation to print' operation, for example unlocking an additive manufacturing apparatus for use. In some examples, the association between the data source and the supply may be a physical association, for example a data source such as a solid state memory may be attached to a container in which the build material is transported. However, even if the build material is physically or otherwise associated with a supply of build material, it may that counterfeit or uncontrolled sources of build material are available. Thus, in some examples set out herein, the source of the data and/or the data source is verifiable such that a user may be confident that the build material is from a trusted source and, where build material parameters are provided, the user may be confident that the build material is as described by the build material parameter(s).

FIG. 1 shows an example of a data unit 100. The data unit 100 may be a portable and/or standalone data unit, for example being readily transportable by hand. The data unit 100 may for example comprise a 'smart card', and/or have dimensions, at least in a portion thereof, corresponding to the dimensions of a Universal Integrated Circuit Card (UICC), also known as a subscriber identity module, or SIM card. The data unit 100 of FIG. 1 comprises a mounting 102, the mounting 102 being to removably mount the data unit 100 on a receiving portion of an additive manufacturing build material container. In some examples, the mounting 102 may for example have a shape or dimension which is complementary to a shape or feature of the receiving portion. In other examples, the mounting 102 may comprise features which adhere to, interact with, or interlock with, features of the receiving portion. The mounting 102 may provide a platform for, or may enclose, other components of the data unit 100. The mounting 102 may also provide for easy handling of the data unit, in some examples providing a portion which may be readily held in a user's hand.

The data unit 100 further comprises a data source 104, in this example a memory which is to store a plurality of additive manufacturing parameters, examples of which are described in greater detail below. The memory 104 may for example comprise non-volatile memory, such as at least one of read-only memory (ROM, or erasable programmable ROM, EPROM), flash memory, ferroelectric RAM (F-RAM), magnetic memory, optical memory or the like. In some examples, the memory 104 may store data for a prolonged period. In other examples, the memory 104 may be for temporary storage of data, for example following generation thereof in response to a request for data.

The data unit 100 further comprises a communications interface 106 to communicate with a reader of an additive manufacturing build material processing apparatus. For example, such apparatus may be an additive manufacturing apparatus or '3D printer' which fabricates an object in a layer wise manner, or may be build material treatment apparatus, such as a build material mixing apparatus, or some other apparatus for use in additive manufacturing. In some examples, the communications interface 106 may comprise a galvanic interface, i.e. an electrical connection is made over which data may be sent or received. In other example, the communications interface 106 may operate using 'wireless' communication methods, such as radio or optical transmission methods. Data from the memory 104 may be transmitted to the additive manufacturing build material processing apparatus by the communications interface 106. The communications interface 106 may be to communicate with at least two classes of additive manufacturing build material processing apparatus, for example with both of additive manufacturing apparatus and build material treatment apparatus.

As the data unit 100 is provided with a mounting 102 which may be removably mounted on a build material container, it may be either read in situ on a build material container, or removed therefrom for reading. For example, when in situ on the build material container, it may be read using a reader which is brought into proximity therewith. In some examples, the reader may be provided in a build material extraction element, as described below. However, as the data unit 100 may be removed from the build material container, it may be communicably coupled with other reader apparatus. For example, the data unit 100 could be placed in a reader slot or drive, or brought into proximity with a proximity reader or the like. This means that the content of the data unit 100 may be accessed in different ways and by different apparatus, which in turn eases the specifications for an end user to have a particular reader apparatus.

To consider an example in which a reader is provided in an extraction element such as an aspiration, or vacuum, tube and is intended to communicate with the data unit 100 in situ, this allows for ease of handling of the build material and for transfer of information from the data unit 100. However, it may be the case that additive manufacturing apparatus could be operated in the absence of such an extraction element (of using an extraction element which does not include a reader). In that case, as the data unit 100 is arranged to be removably mounted, it may be removed from the build material container and read in an alternative fashion. This increases the options for accessing the data thereon (which, as noted above, may enhance safety by correctly identifying build materials or attributes thereof, or providing authentication of the source of the build material and/or data content). For example, a user could convey a data unit 100 to alternative reader apparatus, such as a card slot on an additive manufacturing apparatus.

It may also be noted that build material containers may be bulky, and the contents thereof may be relatively costly. By providing a separable data unit 100, the whole container need not be moved to access the data in some examples, and a faulty data unit 100 may be replaced with replacing the entire build material container (and in some examples, its content).

In some examples, the data unit mounting 102 may be adapted for tool-less insertion and/or removal from a build material container. This increases the flexibility of the data unit 100 as it may be added to and/or removed from a build material container without any tools (and thus may for example be easily removed or added by an end user).

The additive manufacturing parameters stored in the memory 104 may comprise authentication data. The authentication data may be for use in authentication of the build material and/or the data stored in the memory. In some examples, the authentication data may allow the data unit 100 to authenticate other apparatus or data sources, for example an additive manufacturing apparatus with which it is in communication. For example, the memory 104 may be provided with a key, or a password, for use in authentication.

The additive manufacturing parameters stored in the memory 104 may comprise build material identification data. For example, this may comprise an identification of the material, class of material, particle size, range of particle sizes, origin (for example, supplier, country of origin, factory of origin) or the like.

In some examples, the additive manufacturing parameters may comprise build material processing parameters, for example temperatures, speeds or other conditions of processing.

In some examples, the additive manufacturing parameters may comprise compatible build material identification data. Compatible may mean that the build materials can be mixed and an object successfully (and/or safely) generated therefrom. For example, a particular plastic build material may be compatible with itself and a range of other plastics (for example, a build material may be compatible with, or belong to, at least one compatible 'family' of materials). However, the plastic may be incompatible with other plastics, or with other classes of material such as at least one rubber. Compatible and/or incompatible materials could be explicitly listed. Providing a list in this manner may allow an additive manufacturing processing apparatus to learn the compatibility of new build materials.

In some examples, a mixture may be formed deliberately. For example, an object may be generated from build material comprising a proportion of build material from a plurality of sources, which may include at least one source build material container and/or at least one recycled build material source. However, in other examples, at least one build material may be present in small amounts, for example trace amounts may remain in an apparatus from a previous processing activity.

In some examples, the parameters may comprise mixing percentage ranges, for example a maximum or minimum proportion of recycled build material, or of build material of a particular type, or the like. In some examples, the number of generation cycles for which build material has been, or may be, used may be stored as a parameter. In some examples, the parameters may be indicative of at least one, or any combination of the following parameters (with example units), each for example being stored in a memory field.

| Name | Units |
| --- | --- |
| Peak Temperature of Melting | ° C. |
| Onset temperature of Melting Peak | ° C. |
| Extrapolated onset temperature of Melting Peak | ° C. |
| Onset temperature of Melting Peak | ° C. |
| Melting Enthalpy | KJ/Kg |
| Peak temperature of Recrystallization | ° C. |
| Onset temperature of Recrystallization Peak | ° C. |
| Extrapolated Onset temperature of Recrystallization Peak | ° C. |
| Glass Transition Temperature | ° C. |
| Vicat Softening Temperature | ° C. |
| Absorption coefficient @ 1500° K color temperature | % |
| Absorption coefficient @ 3000° K color temperature | % |
| Color (yellow index) | Index |
| Emissivity coefficient at Melt Temperature | % |
| Particle size - 10 percentile | um |
| Particle size - 50 percentile | um |
| Particle size - 90 percentile | um |
| Powder density (loose) | $g/cm^3$ |
| Powder density (tapped) | $g/cm^3$ |
| Melt flow index | cc/10 min |
| Melt flow temperature | ° C. |
| Base Material Density | $g/cm^3$ |
| Solution Viscosity | Number |
| Solution Viscosity (Solvent Name) | 10 chars |
| Solution Viscosity (Solvent Temp) | ° C. |
| Base Material Specific Heat | KJ/(Kg K) |
| Compatible families (multiple occurrences) | 10 chars |
| Thermal Conductivity | W/(m K) |
| Specific Heat | KJ/(Kg K) |
| Median Avalanche Angle @ ambient Temperature | Deg |
| Median Avalanche Angle @ spread Temperature | Deg |
| Material Flow Function Constant | $g/cm^2$ |
| Material Flow Function Exponent | Number |
| Effective angle of Internal friction | Deg |
| Wall Friction | Number |
| White Powder Transmission depth at 2750 K source | mm |
| Minimum Ignition Temperature dust cloud | ° C. |
| Minimum Ignition temperature powder layer | ° C. |
| Minimum Explosion Concentration | $gr/m^3$ |
| Minimum ignition energy dust cloud | mJ |
| Dust Explosion Class | bar m/s |
| Max explosion pressure | bar |
| Combustion index | Number |
| Maximum recycled powder mix | % |
| Number of Generation cycles | Number |
| Water absorption | % |

These example parameters include processing parameters, material flow parameters and safety parameters. In some examples, the additive manufacturing parameters may be stored in the memory as a compressed XML file. For example, such a file may be an indexed file, and the date may be recoverable by a reader with access to a dictionary. In other examples, XML compressors such as XMill, XGRind, Xpress, XComp or the like may be used.

Figure 2:
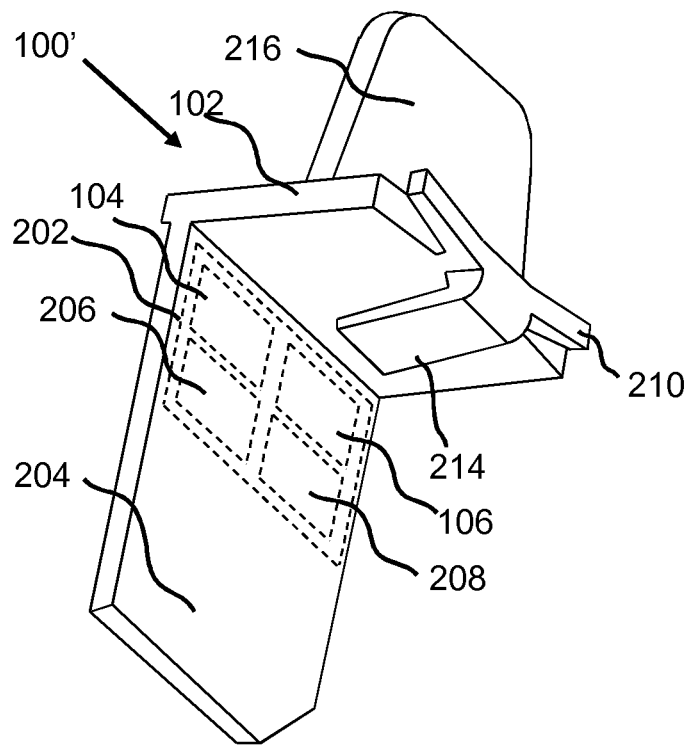
FIG. 2 is another example data unit.

FIG. 2 shows an example of a data unit 100', in which the memory 104 and communications interface 106 are mounted on a portion of the mounting 102 having dimensions corresponding to the dimensions of a Universal Integrated Circuit Card (UICC) (for example, a SIM, MicroSIM or NanoSIM card). In this example, circuitry is mounted on a portion of the mounting 102 which comprises a cut-off corner, which is an orientation feature as may be seen in a SIM card.

The mounting 102 comprises a circuitry portion 202 on which the memory 104 and communications interface 106 are mounted (shown in dotted line as they are provided on the obscured face of the mounting 102) and a registration portion 204, the registration portion 204 being to be received in a corresponding guide portion of the receiving portion of an additive manufacturing build material container. For example, the receiving portion may have a slot-like form, and the registration portion 204 may have dimensions which are slightly smaller than the width of the slot. This may serve to secure and/or position the data unit 100' in the receiving portion.

The communications interface 106 is arranged to communicate with a reader of an additive manufacturing build material processing apparatus. For example, this may be an additive manufacturing apparatus or '3D printer' which fabricates an object in a layer wise manner, or may be build material treatment apparatus, such as a build material mixing apparatus, or some other apparatus for use in additive manufacturing. In some examples, the communications interface 106 may comprise a galvanic interface, i.e. an electrical connection is made over which data may be sent or received. In some examples, the memory 104 and communications interface 106 may operate using 'wireless' communication methods, such as radio or optical transmission methods. Data from the memory 104 may be transmitted to an additive manufacturing apparatus by the communications interface 106

In this example, the data unit 100' further comprises an authentication module 206. The authentication module 206 may for example comprise at least one processor and may be arranged to receive an authentication request from an additive manufacturing build material processing apparatus (for example, received via the communications interface 106) and to provide an authentication response for communication to the additive manufacturing build material processing apparatus. This authentication may be based on an additive manufacturing parameter stored in the memory 104, for example a cryptographic secret code or password of the like.

Thus, the authentication module 206 may provide an additive manufacturing build material processing apparatus with validation of the source of the build material and/or other additive manufacturing parameters via the communications interface 106. The additive manufacturing build material processing apparatus may then (in some examples, on completion of checking of the validity of the authentication response) trust the content of validated data. As the data unit 100' may be associated with a particular source of build material, for example being provided on or in a build material container, once the authentication response is verified, it may be that the associated build material is also considered to be verified and the subsequent processing thereof can be conducted with confidence that both the data and the build material itself are from a trusted source.

For example, the authentication module 206 may be arranged to receive an authentication request from an additive manufacturing build material processing apparatus comprising a message, to encrypt the message (for example using a key issued thereto at manufacture) and provide an authentication response which includes the encrypted message. The build material processing apparatus may know the key (for example, all or a number of the instances of data units 100' may be provided with the same key, or a one of a limited number of keys), or may be able to derive the key based on, for example, another portion of the message. By sending the encrypted message, the data unit 100' proves that it has access to the key, and, as long as it can be trusted that the key has been distributed in a secure manner, this authenticates the identity of the data unit 100'. In other examples, other authentication methods may be used.

The authentication response may comprise at least part of a release code for the additive manufacturing build material processing apparatus, the release code being to authorize at least one additive manufacturing process of the additive manufacturing build material processing apparatus. For example, the release code may comprise a 'right to print' authorization, which allows an additive manufacturing apparatus to print an object (in some cases conditional on attributes of the object, such as the volume or material property specifications being reproducible using the build material associated with the data unit 100', or on an additive manufacturing apparatus being suitable to process the build material, or there being sufficient or appropriate build material available for a particular additive manufacturing task, or the like).

In some examples, the authentication may be two-way, i.e., the authentication module 206 may authenticate the additive manufacturing build material processing apparatus, for example based on the request received therefrom. It may be, for example, that data is not transmitted to the additive manufacturing build material processing apparatus unless the request is authenticated. In some examples, it may be that an authentication response is not transmitted unless the request is authenticated. Such authentication may for example use a shared secret and/or a digital signature or the like.

In this example, at least some additive manufacturing parameters are stored in an encrypted form and the data unit 100' comprises a data security module 208, which may decrypt the data before transmission to an additive manufacturing build material processing apparatus. In some examples, the data may be (re)encrypted prior to transmission, for example based on a session key established following authentication, or using a public key of the build material processing apparatus.

In some examples, at least some portions of the memory 104 are writable. In some such examples, the communications interface 106 may be arranged to receive data and to write the data to the memory 104. For example, this may be data relating to at least one of the plurality of additive manufacturing parameters. In some examples, the memory 104 may comprises a plurality of data fields and at least some data fields of the memory 104 may be associated with a condition. In such examples, the data to be written to the memory 104 may be associated with a validity check. For example, it may be case that a certain data field relates to the volume of build material in a container (which may, in some examples, be dispensed in a metered manner), and the container is not to be refilled. In such an example, it may be that field may be decremented, i.e. the value therein may reduce, but not increase. In such an example, a processing module of the data source may verify that the data meets the criteria before allowing the data field to be overwritten. In some examples, certain data fields may be written to 'read-only' data fields. This can be a function of the memory 104 itself (i.e. there may be no way of rewriting the memory) or may be controlled by a processing module. Other data fields may be rewritten once, or until a data field is locked, (for example, to identify the build material processing apparatus which uses the build material associated therewith), and thereafter become read-only data fields. Other data fields may be associated with a token, for example comprising one or more bits which may be flipped from a 0 to a 1. In some examples, the token may be changed just once. Other data fields may be read and written to on several occasions.

In some examples, the authentication module 206 may verify at least one of the additive manufacturing build material processing apparatus and the data content prior to writing the data to the memory 104. In some examples, locally generated data, for example determined by a processor of data unit 100' may be written the memory 104.

In some examples, the memory 104 may be written with data to the effect that the data unit 100' will not authorise a subsequent read operation and/or build material processing operation. For example, data may be written to the effect that the build material is exhausted (e.g. a field relating to the volume of the build material may be set to zero, or empty). In another example, a key used for authentication may be overwritten or deleted such that the build material can no longer be authenticated. In another example, the memory may be cleared or overwritten (for example scrambled), or a flag may be set indicating that the data has been accessed.

Such measures may mean that the data unit 100' is prevented from providing a subsequent authorisation to print. This may for example be useful in preventing an attempt to circumvent the security provided by the data unit 100' by reusing the data unit 100' with build material from multiple containers. Unless a preventative measure is taken, this could result in false authorisation of build material and/or false authentication of data. However, by taking action to prevent reuse of the data unit 100', the risks of such circumvention are reduced.

In some examples, at least a portion of the memory 104 could be written or rewritten with parameters 'on the fly', i.e. parameters may be generated for substantially immediate transmission to additive manufacturing build material processing apparatus. For example, a volume of build material may be determined based on a measurement of a volume or weight of build material in the container made in response to a request for parameters, passed to memory (for example on a transient basis) and transmitted to an additive manufacturing build material processing apparatus. In such examples, the memory 104 may comprise, at least in part, a transient memory, an 'overlay' memory, a data cache and/or a memory buffer, or the like, in which parameters are stored on a short term basis. However, such parameters may also be generated following a request and stored in a persistent manner, or until over-written.

The mounting 102 of FIG. 2 comprises a compressible element 210, in this example comprising a region of the mounting 102 separated from a body thereof by a pair of slots. It may be noted that this compressible element 210 comprises two arms which bow outwards, and may be caused to bend inwards, closing the slots by pressing the compressible element 210 against a rigid element, which may be provided on a build material container. The maximal longitudinal length of mounting in this plane is defined by the positions of the arms. When the arms are flexed towards the body of the mounting 102, the compressible element 210 is compressed and this reduces the longitudinal dimension of the mounting 102 in this plane. However, this dimension could be reduced in some other way, for example by providing a telescoping portion, or a concertina portion, or the like and therefore this is just one example of a compressible element 210. The compressible element 210 is resilient, such that the slots will open unless pressure is applied thereto. This may assist in locating the mounting 102 within a receiving portion of a build material container. In some examples, the mounting 102 may be configured such that a user may compress the compressible element 210 without a mechanical advantage or a tool. This may allow tool-less insertion and/or removal of the mounting 102.

The mounting 102 further comprises a retaining feature 214 for interacting with a build container, in this example comprising a tongue, which is arranged to interact with a retaining projection 406 of the build material container. The mounting 102 further comprises a tab 216, which is positioned so as to be holdable by a user in inserting or the data unit 100' into a receiving portion of a build material container, or removing the data unit 100' therefrom.

The retaining feature 214 may be plastically deformable, i.e. deformation thereof is at least partially irreversible. There may be some elastic deformation of the retaining feature 214, but beyond a threshold stress (which may be less than the pressure applied remove a data unit 100 from the build material container), the deformation may be permanent (for example, the retaining feature 214 may snap or break) or otherwise apparent from inspection of the mounting 102. This may reduce the reusability of a data unit 100', and may provide a tamper evident feature. In some examples, deformation of the retaining feature 214 may occur in preference to other portions of the data unit mounting 102. For example, the retaining feature may be relatively weaker (for example, more readily bent or broken) than the circuitry portion 202. This may mean that circuitry (in this example, the memory 104 and communications interface 106) is mounted is mounted on a portion which is unlikely to bend or flex under normal manipulation of the data unit 100', and may therefore be protected from damage which could be caused by such bending.

In some examples, the mounting 102 may be configured such that a user may deform, or break, the retaining feature 214 without a mechanical advantage or a tool. This may allow tool-less insertion of the mounting 102.

The data unit mounting 102 may comprise, in whole or in part, a plastic material. As such, the mounting 102 may be relatively low cost. The data unit mounting 102 may be a plastic, monolithic component. In some examples, the data unit mounting 102 may comprise, in whole or in part, a conductive plastic material. In order to prevent a build-up of static energy, conductive components may be used to couple the build material container to other apparatus. Providing a conductive mounting contributes to the electrical coupling. In other examples, non-conductive mountings may be provided. In some examples, the mounting may be conductive, but comprise a different material, such as an electrically insulating plastic bearing metal tracks, or be formed of metal or the like. By providing a separable mounting 102, the conductive properties of a data unit 100. 100' may be designed separately to the conductive properties of any other aspect of the build material container, which may reduce compromise in design. For example, in order to function with particular read apparatus (for example, to mitigate interference or the like), it may be that any circuitry may be electrically isolated by providing an electrically isolating mounting 102. Therefore, in some examples, the mounting 102 may comprise a different material, or have different material properties, to a build material container in which it is mounted.

As is shown in FIG. 2, the data unit mounting 102 may comprise a first planar portion and a second planar portion, the planar portions being substantially orthogonal. In an example, the planar portions may be connected substantially along a shared edge. The circuitry region may be on the first planar portion, and the second planar portion may provide a 'stop' surface when the first planar portion is inserted into a reader, and may ensure that the data unit 100' at least partially remains outside such a reader.

Figure 3:
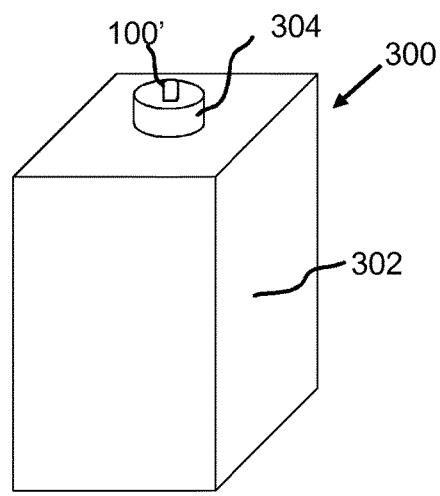
FIG. 3 is an example of build material container.

FIG. 3 shows an example of a container 300 comprising a data unit 100' and a storage volume 302 to contain additive manufacturing build material. In some examples, the container 300 may contain a build material. In this example, the data unit 100' is situated in the region of an opening 304 in the container 300, in particular in a neck thereof. The build material container further comprises a storage volume 302 to contain additive manufacturing build material.

In one example the container 300 may contain a source supply of fresh build material. In another example the container 300 is a source supply of recycled or partly recycled build material. In yet another example the container 300 may be used, at least temporarily, as a buffer supply.

The storage volume 302 may comprise a reservoir to hold build material. In some examples, the storage volume 302 may include an upper upright section having relatively upright side walls, at least in a filled state, along most of the height of the reservoir, a lower funnel having converging side walls; and a build material outlet structure providing the opening to allow build material to exit the reservoir. The reservoir may comprise, or be lined with, a flexible material such that, when build material is removed therefrom (for example under a negative pressure), the volume of the reservoir may decrease. The reservoir may be contained in a rigid or semi rigid supporting structure which does not deform.

In some examples, the data unit 100' may be arranged in the opening such that when an extraction element is attached thereto, a memory reader in the extraction element may read the data unit 100'. In some examples, the extraction element may be at least temporarily attached to the opening based on its orientation (e.g., there may be a locked or fixed orientation and unlocked orientation). In such examples, the locked orientation may be an orientation in which the reader is proximate to, or interlinked with, the data unit 100'.

Figure 4:
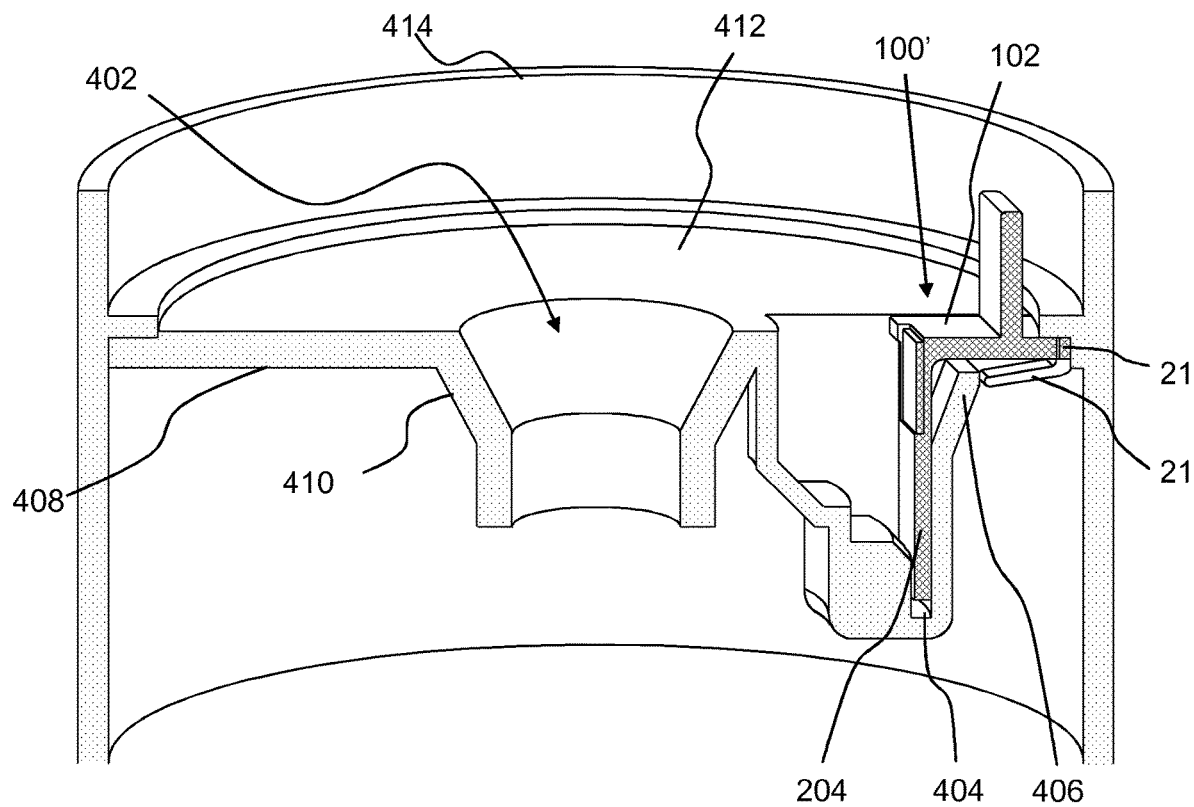
FIG. 4 is an example of an opening in a build material container.

FIG. 4 shows, in cross section, an example of an opening 402 in a build material container. As can been seen, the registration portion 204 of the mounting 102 is received within a slot 404, which locates the data unit 100' in a predetermined position (for example, a position in which it can be read by a reader). A retaining projection 406 is arranged to interact with the securing feature 214. When the data unit 100' is placed into the opening 402, the compressible element 210 may be urged against a portion of the opening which curves in the opposite direction to the bow of the compressible element 210. This closes the slots. The securing feature 214 may also flex then resiliently straighten so as to be held in place by the projection 406. The compressible element 210 then urges the securing feature so as to be retained by the projection 406. In this example, the data unit 100' can be removed from the opening by urging it towards the centre of the opening 402. This may cause the securing feature 214 to bend or even break away, and the material in the region of the compressible element 210 may also bend or break (for example, at the narrowed portion defined between the slots), so as to release the data unit 100' from the opening 402.

In this example, an outlet structure 408 is arranged in the opening 402. The outlet structure 408 in this example comprises a retaining structure to maintain a connection to a connecting build material extraction element such as an aspiration tube which may be used to draw build material from the reservoir in to a build material processing apparatus. In particular, the outlet structure 408 comprises an adaptor 410 to guide an external aspiration system in connection with the outlet structure 408, the adaptor comprising an interface face 412 around its outlet opening, the interface face 412 extending perpendicular to an aspiration direction, and a standing circumferential wall 414 within which an aspiration tube is to be inserted to engage the interface face 412. In some examples, the outlet structure 408 may include a collect structure to collect build material from the bottom and guide the build material to an outlet opening at the top. For example, this may be a tube (which may be rigid tube) which extends to the lower portions of the reservoir.

Figure 5:
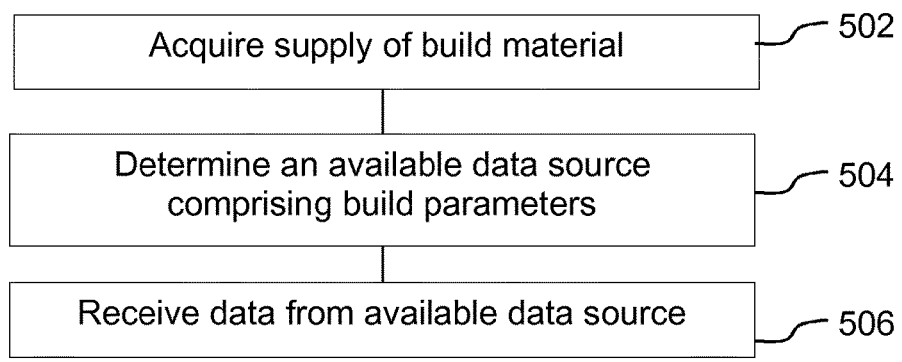
FIG. 5 is a flowchart of a method of acquiring data from a data source.

FIG. 5 is an example of a method comprising, in block 502, acquiring, at an additive manufacturing apparatus, a supply of build material for additive manufacturing. Block 504 comprises determining, from a plurality of possible data sources, an available data source comprising additive manufacturing parameters, and block 506 comprises receiving data from the available data source.

This method therefore allows additive manufacturing parameters (which may be build material parameters and/or build authorisation parameters) to be retrieved from a plurality of sources.

For example, the data source may comprise a data unit 100, 100' or the data source may be provided as part of a transfer vessel.

Figure 6:
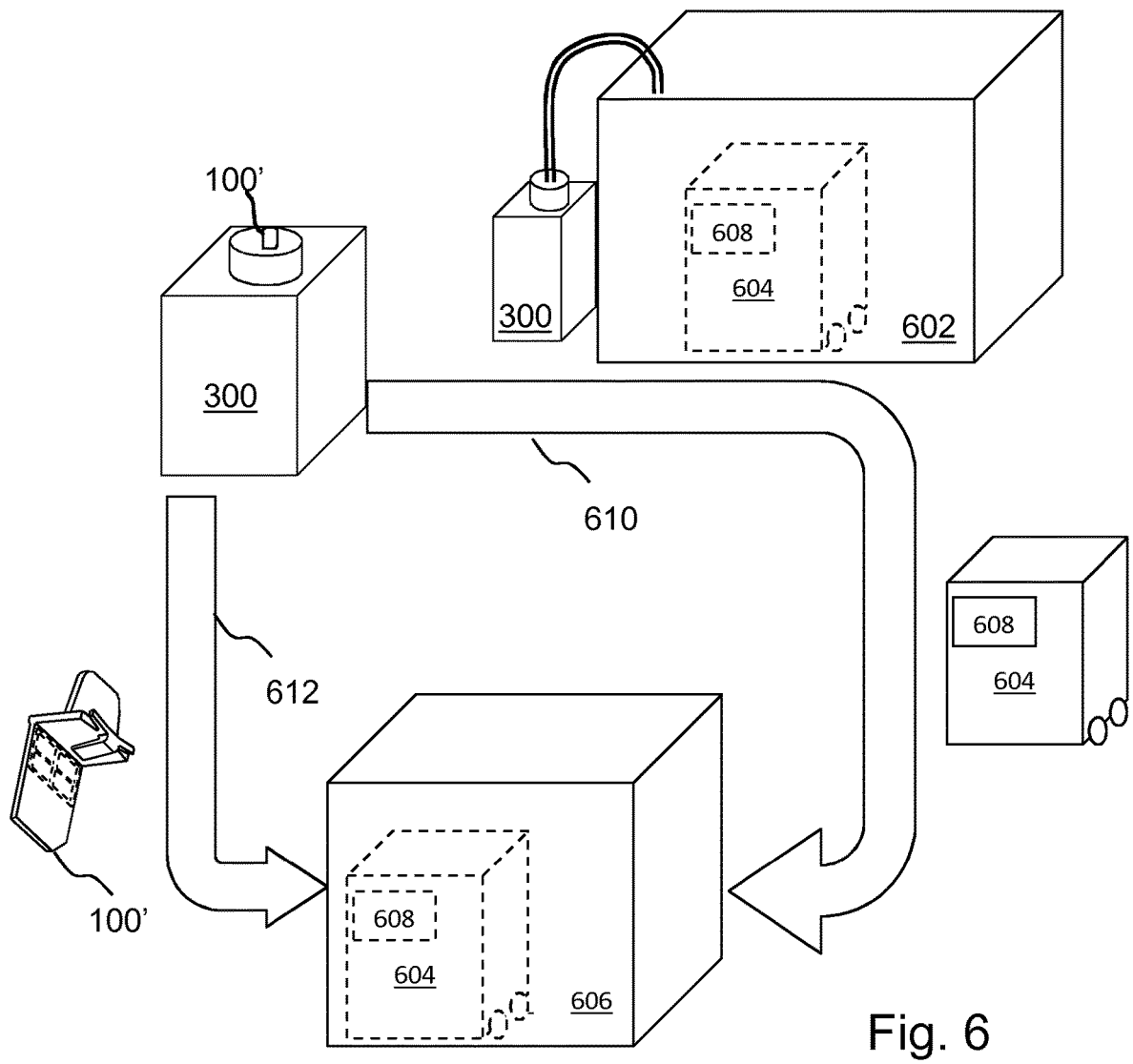
FIG. 6 is a schematic representation of example data transfer routes in an additive manufacturing system.

An example of a system of apparatus is shown in FIG. 6. In this example, there are two routes for validation, authorisation and/or build parameters to be transferred from an initial data source, which may be provided as a data unit 100, 100' supplied on a build material container 300, to an additive manufacturing apparatus 606. For example, it may be the case that the build material is processed (for example, mixed with other sources of build material) in a first apparatus 602, transferred to a transfer vessel 604 and transported to a second apparatus 606 for object generation. In such an example, the data from a data unit 100, 100' may be read therefrom by the first apparatus 602, and transferred to a memory 608 of the transfer vessel 604. In such examples, the second apparatus 606 (i.e. the additive manufacturing apparatus) may be able to read the data directly from the memory of the transfer vessel 604, i.e. the data source may be provided on the transfer vessel 604. In other examples, the second apparatus 606 may be in communication with the first apparatus 602, which may therefore provide a data source. However, in some examples, a user may not own or operate the first apparatus 602. In such an example, the user may instead detach the data unit 100, 100' from a build material container 300 and provide the data unit 100, 100' to, for example, a card reader of the additive manufacturing apparatus 606. In such an example, the data unit 100, 100' may provide a data source which is directly available to the additive manufacturing apparatus 606.

In the example of FIG. 6, there is therefore a first data route 610 and a second data route 612.

In the first data route 610, the data unit 100, 100' is read by a reader in an extraction tube of the first apparatus 602, which in this example is a build material mixing apparatus. The build material may perform authentication and/or validation. The build material mixing apparatus then passes data onto the transfer vessel 604, specifically into the memory 608 thereof. In order to maintain security, this data may be signed or encrypted or the like so as to be authenticable by the additive manufacturing apparatus 606. This data may include the data as read from the data unit 100, 100' and/or other data. For example, the build material mixing apparatus may fill a single transfer vessel 604 with build material from more than one source, and may include data in relation to the build materials mixed, the mixing proportions and the like. The build material mixing apparatus may also write data to the data unit 100, 100', for example how much build material has been removed therefrom.

The transfer vessel 604, which in this example is a trolley, is then transferred (i.e. physically moved) to the additive manufacturing apparatus 606, which may then read the memory 608, and acquire validation, authentication and/or build parameters and the like. Thus, in the example of the first data route 610, the additive manufacturing apparatus may be provided with an authorisation and/or additive manufacturing data via the transfer vessel 604, which may itself acquires data from a pre-treatment apparatus. As such, the parameters and/or the (at least implicit) authorisation travel with the build material to which they pertain, providing for ease of use and/or security enhancements as the parameters/authorisation may be consistently associated with the correct build material.

In the second data route 612, the data unit 100, 100' is separated from the build material container 300, and passed directly to the additive manufacturing apparatus 606. The additive manufacturing apparatus 606 may then acquire validation, authentication and/or build parameters and the like directly from the data unit 100, 100'. In such an example, build material may for example be tipped into the transfer vessel 604 from the build material container 300, and the transfer vessel 604 coupled to the additive manufacturing apparatus 606. In such examples, the memory 608 may not contain data, or may not contain authorised or verifiable (for example, by validation) data. In some examples, obtaining access to the interior of the transfer vessel 604, for example to manually tip the content of a build material container into the transfer vessel 604, may cause the memory 608 to be blanked, or written with data indicating that any memory content thereof is not suitable for providing additive manufacturing parameters in relation to the build material contained therein.

In other examples, there may be other data sources, for example an internet connection to a remote data source, or a proximity reader, a wired or wireless communication between the first and second apparatus, an extraction element of the second apparatus or the like. By considering multiple data sources, additive manufacturing parameters may be provided to the additive manufacturing build material processing apparatus in a plurality of ways, and the versatility of the apparatus may be increased.

Figure 7:
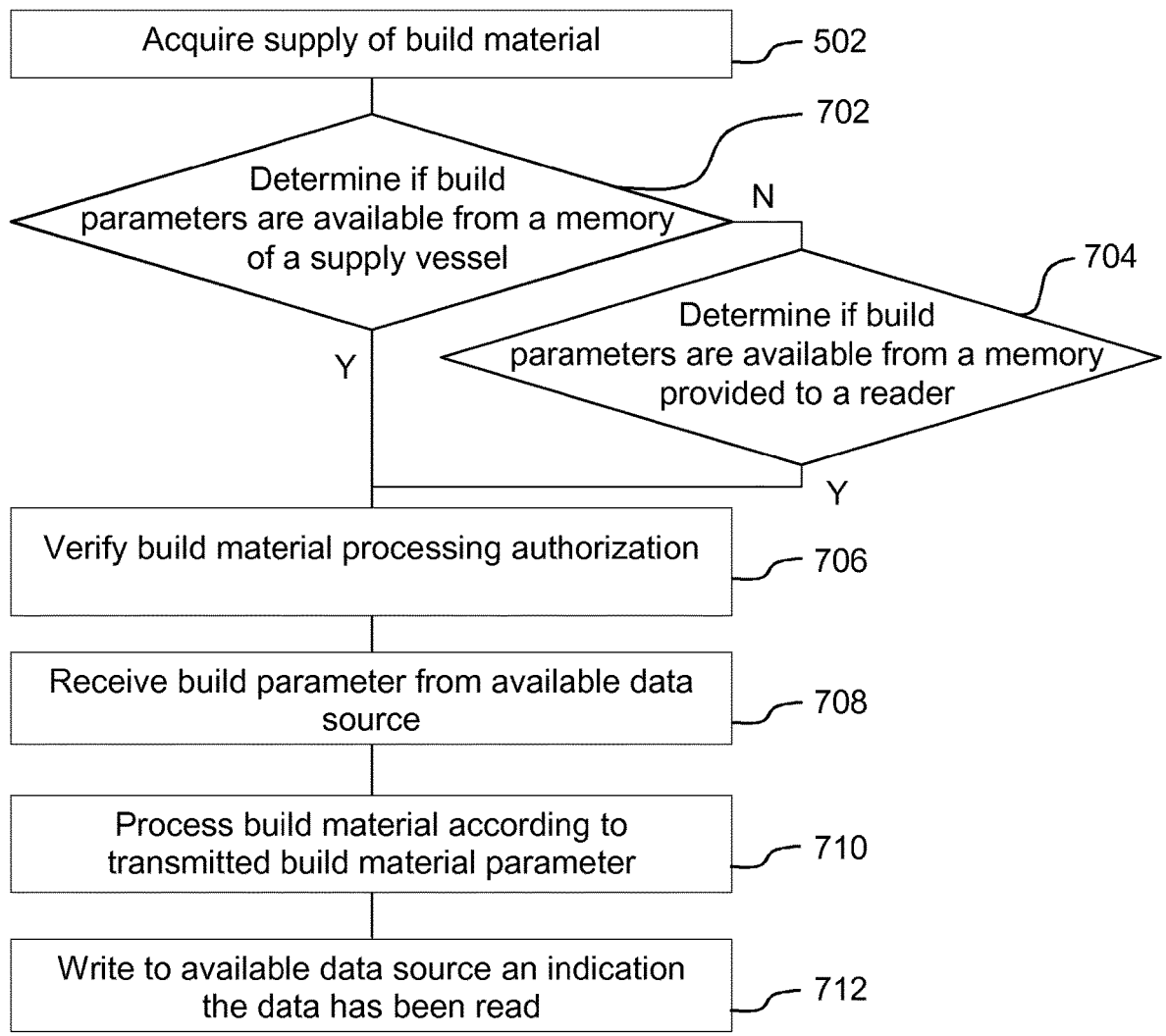
FIG. 7 is a flowchart of a method for exchanging data with a data source.

FIG. 7 provides an example of another method, comprising block 502 as described in relation to FIG. 5. Blocks 702 and 704 are an example of determining an available data source as described in relation to block 504 above. In block 702, the additive manufacturing apparatus determines, via a communication link (which may be wired or wireless, for example comprising an optical or radio communications link), if the additive manufacturing parameters are available from a memory of a supply vessel containing the build material. This may for example comprise determining if the memory thereof contains data. In some example, it may be verified that the data is at least one of: authorised data, data written thereto within a time-out window, data which may be validated by the additive manufacturing apparatus or the like. If not, the method comprises, in block 704, determining if the additive manufacturing parameters are available from a memory provided to a reader of the additive manufacturing apparatus. Determining that the data source is available may comprise determining that a data source has been presented to the reader, and, in some examples, validating the data thereon. If no data source is available, the method may terminate. Once a data source has been determined, data may be received from the available data source. Blocks 706 and 708 are an example of receiving data as described in relation to block 506 above. In this example, the data comprises, in block 706, a build material processing authorization, wherein a validity of the build material processing authorization is verifiable by the additive manufacturing apparatus. This may for example comprise verification of a digital signature, or verification based on encryption, or the like. It may be noted therefore that the method provides for a plurality of data sources which may provide an authorisation.

Block 708 comprises receiving at least one additive manufacturing build material parameter from the available data source. For example, these may specify at least one processing parameter such as a processing temperature. For examples in which compatibility parameters are included in the build material parameters, this may comprise considering if the build material is compatible with the apparatus, or with build material previously used in the apparatus (for example, build materials used since a cleaning cycle). Block 710 comprises processing the build material by the additive manufacturing apparatus according to the transmitted at least one additive manufacturing build material parameter. In some examples, processing the build material by the additive manufacturing apparatus may comprise rejecting the build material, for example on the basis that it is incompatible with the additive manufacturing apparatus (or with the additive manufacturing apparatus in a given state). This may therefore enhance safety, as the build material will be processed if compatible and/or according to parameters provided by the data source.

Block 712 comprises writing, to the available data source, an indication that the data thereon has been read. In some examples, the data to be written may depend on the data source. For example, if the data source is a portable data unit (for example a data unit 100, 100'), writing, to the available data source, an indication that the data thereon has been read may set a volume of build material remaining to be none, or may set a flag or revoke a key. This may result in the ability of the data source to authenticate or allow object generation processes to carried out in a manner authorised thereby being revoked, which may be useful where the amount of build material dispensed is unmetered. However, if the data source is a memory of a transport apparatus, the data source may be written with an indication of how much build material has been used, or other data associated with the processing of the build material, such as temperatures, fusing agents or other print agents, an identification of the apparatus used to perform the processing or the like.

Figure 8:
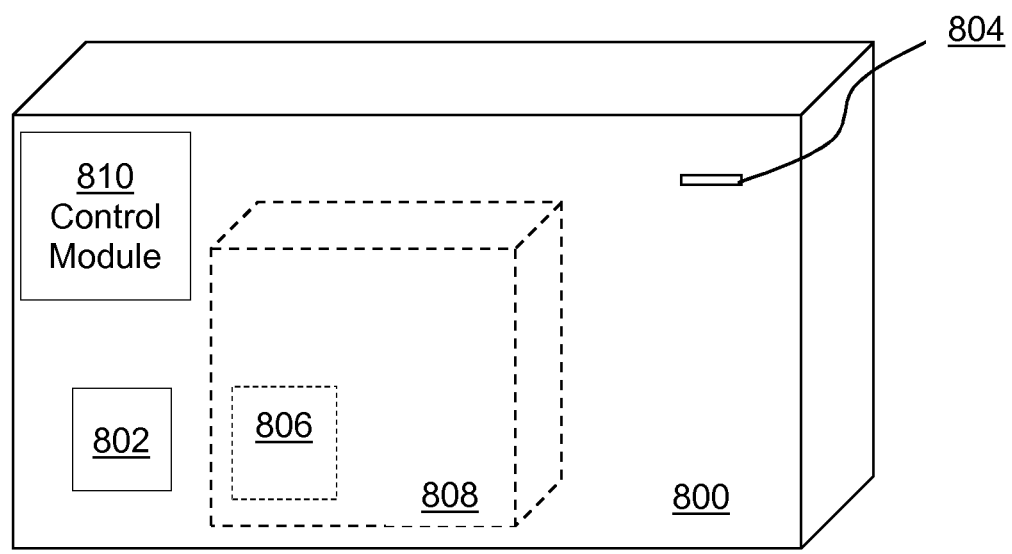
FIG. 8 is a schematic drawing of an example of an additive manufacturing apparatus.

FIG. 8 is an example of an additive manufacturing apparatus 800 comprising a first interface 802 and second interface 804. Both the first and second interfaces 802, 804 are to receive data associated with a build material. The first interface 802 is to receive data from a first data source. In the example of the Figures, this is a data source associated with a memory 806 of a build material transport apparatus 808. The second interface 804 comprises a reader to receive data from a portable data unit. In this example, the reader comprises an opening to receive at least part of the portable data unit, which may be portable in the sense of being a standalone unit of non-volatile memory, which can be held or carried. In some examples, the portable data unit may comprise a memory card, such as a UICC or the like. In some examples, the portable data unit may be a data unit 100, 100' as described above.

In some examples, the first interface 802 may be an interface to receive data from a memory which is associated (for example, physically associated) with a source of build material. For example, the first interface 802 may be to interface with a memory which is mounted on or in a build material vessel (which may be a trolley or may be a build material container, or any other vessel for build material). In some examples, the first data source may comprise at least part of any apparatus which has received data, directly or indirectly, from a portable data unit, and the first interface 802 may be an interface to receive data from such a data source.

The additive manufacturing apparatus 800 further comprises a control module 810 to control object generation based at least in part on the received data. For example, the data may comprise data authorising a print activity, or validating the source of build material, or may comprise at least one setting for the manufacturing process (or data allowing at least one setting to be determined).

In this example, the additive manufacturing apparatus 800 is arranged to receive the transport apparatus 808, which comprises a trolley, and which provides a print bed, but in other examples, the build material may be transferred from the transport apparatus to the additive manufacturing apparatus 800 in another manner, for example via a hose or the like. In such examples the first interface 802 may be provided on the hose, or on other apparatus through which build material is received.

The control module 810 may determine which interface 802, 804 is in communication with an available data source, and may receive data from the available data source via the associated interface. For example, the control module 810 may carry out the method of blocks 504 and 506 or blocks 702 to 712 above.

In some examples, the control module 810 of the additive manufacturing apparatus 800 may validate a data source. This may for example comprise verifying a digital signature, or carrying out a cryptographic message exchange or the like. The validation may for example be associated with a time limit, for example, unless the build material is presented within a time window, the validation may expire. In some examples, where the data source is a transport apparatus, an initial validation may be carried out by another build material processing apparatus, for example a build material mixing apparatus or the like, which may be the build material processing apparatus which initially receives the build material from a build material container. Such an apparatus may digitally sign data which is written to the memory of the transport apparatus, and validation by the control module 810 may comprise validation of the signature. Where the data source is a portable data source such as a data unit 100, 100', authentication may be carried out with an authentication module 206 thereof, as described above. In some examples, such validation may be carried out in order to determine which data source is an available data source for additive manufacturing parameters—i.e. in some examples, a data source may be validated in order to be considered available.

In some examples, the control module 810 of the additive manufacturing apparatus 800 may receive, from the data source, at least one compatibility indicator of the build material. This may be used to determine if the build material meets predetermined compatibility criteria. The compatibility criteria may relate to mixtures of build materials (for example, whether the additive manufacturing apparatus has been used to process an incompatible build material, and may contain at least trace amounts thereof to an extent that proceeding with object generation may be dangerous or likely to be impaired), or the capability of the additive manufacturing apparatus to provide processing conditions such as temperatures and the like specified in the additive manufacturing parameters. In some examples, the compatibility criteria may be based, at least in part, on a particular object to be generated. For example, the control module 810 may determine if a volume of build material is sufficient to manufacture an object, or if the build material is of a type which is suitable to produce specified physical qualities of the object, or the like.

In some examples, the control module 810 of the additive manufacturing apparatus 800 may receive, from the data source, at least one build material processing parameter. For example, this may specify at least one temperature or time setting to be used in object generation, or may specify at least one print agent for use in object generation. In such examples, the control module may control at least one setting of the additive manufacturing apparatus 800 according to the at least one build material processing parameter.

In some examples, if the data source is valid and/or the build material meets predetermined compatibility criteria, the control module 810 may generate a release code, which may for example permit object generation to commence. In other examples, a release code may be supplied from the data source. Generation of a release code may be dependent on other parameters. By providing the possibility of authorising an additive manufacturing apparatus 800 to manufacture an object via a plurality of interfaces 802, 804, this increases the flexibility of the system without unduly diminishing security.

The additive manufacturing apparatus 800 may comprise additional components associated with additive manufacturing, such as energy source, print agent and build material distributors and the like.

In some examples, the control module 810 may write data to a portable data unit in communication with the second interface. For example, the control module 810 may write data to the data unit to the effect that the data unit has been read, and this may result in the ability of the data source to authenticate or allow object generation processes to carried out in a manner authorised thereby being revoked, and/or subsequent validation of the data provided by the data source may be revoked.

Some aspects in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that some flows and/or blocks in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the authentication module 206, data security module 208, control module 810 and the like) may be implemented by a processor executing machine readable instructions stored in a memory, or a processor operating in accordance with instructions embedded in logic circuitry.

The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

What is claimed is:

1. A data unit of an additive manufacturing system, the data unit comprising:
    a mounting to removably mount the data unit on a receiving portion of an additive manufacturing build material container for containing a source supply of build material;
    a data source to store data comprising a plurality of additive manufacturing parameters of the build material; and
    a communications interface to communicate with a reader of an additive manufacturing build material processing apparatus separate from the build material container,
    wherein the communications interface is to transmit stored data from the data source to the additive manufacturing build material processing apparatus and receive commands to write or change data in the data source; and
    wherein the data source is organized into data fields, at least one of the fields having a condition that governs use of the at least one field with a condition to prevent use of the additive manufacturing build material container after an unauthorized refilling of the container.

2. The data unit of claim 1 in which the mounting comprises: a first portion on which the data source and communications interface is mounted, and
    a registration portion, the registration portion to be received in a corresponding guide portion of the receiving portion of the additive manufacturing build material container.

3. The data unit of claim 1 wherein the data source comprises a first data field to store a value for an amount of build material remaining in the additive manufacturing build material container, the first data field having a condition that the value in the first data field can only be decremented.

4. The data unit of claim 1 further comprising an authentication module to provide an authentication response to an authentication request, the authentication response being for communication to the additive manufacturing build material processing apparatus, wherein the data source comprise a first data field to store a key used for authentication, wherein a condition associated with the first data field requires a processing module of the data source to delete or overwrite the key in response to an indication that build material in the additive manufacturing build material container is exhausted.

5. The data unit of claim 4 in which the authentication module is to receive an authentication request comprising message, to encrypt the message and in which the authentication response comprises the encrypted message.

6. The data unit of claim 4 in which the authentication module is to authenticate a request from the additive manufacturing build material processing apparatus and, if the request is authenticated, to transmit data from the data source to the additive manufacturing build material processing apparatus.

7. The data unit of claim 4 in which the authentication response comprises a release code for the additive manufacturing build material processing apparatus, the release code being to authorize at least one additive manufacturing process of an additive manufacturing build material processing apparatus.

8. The data unit of claim 1 which comprises a processing module of the data source, the processing module of the data source to verify that the condition is met before permitting an associated data field to be overwritten.

9. The data unit of claim 1 wherein the data source comprises a first data field to store data identifying the additive manufacturing build material processing apparatus authorized to use the additive manufacturing build material container, the first data field having a condition that makes the first data field read-only after an initial write is accepted.

10. The data unit and additive manufacturing system according to claim 1 further comprising a build material container having the data unit removably mounted thereon and comprising a storage volume to contain additive manufacturing build material;
    wherein the data source comprises a first data field to store a flag indicating that build material in the storage volume has been exhausted, the first data field having a condition that locks the data field and prevents any overwrite after the flag is set indicating that build material in the storage volume is exhausted.

11. A method of operating an additive manufacturing system comprising a data unit, the data unit comprising:
    a mounting to removably mount the data unit on a receiving portion of an additive manufacturing build material container containing a source supply of build material;

a data source to store data comprising a plurality of additive manufacturing parameters of the build material; and a communications interface to communicate with a reader of an additive manufacturing build material processing apparatus separate from the build material container, wherein the communications interface is to transmit stored data from the data source to the additive manufacturing build material processing apparatus, the additive manufacturing build material processing apparatus comprising an additive manufacturing apparatus;

the method comprising:

acquiring, at the additive manufacturing apparatus, the supply of build material for additive manufacturing;

removing the data unit from the additive manufacturing build material container;

interfacing the communications interface of the data unit with a corresponding interface of the additive manufacturing apparatus; and receiving stored data from the data source to the additive manufacturing apparatus, wherein the data source is organized into data fields, at least one of the fields having a condition that governs use of the at least one field, the at least one field with a condition to prevent use of the build material container after an unauthorized refilling of the container.

12. A method according to claim 11 further comprising processing the build material by the additive manufacturing apparatus according to the received data.

13. A method according to claim 11 further comprising determining if the additive manufacturing parameters are available from the data source, the data source comprising a memory of a transfer vessel containing the build material.

14. A method according to claim 13 further comprising determining another available data source that comprises the additive manufacturing parameters when the additive manufacturing parameters are not available from the data source provided to the reader of the additive manufacturing apparatus.

15. A method according to claim 11 further comprising validating the additive manufacturing parameters from the data source.

16. A method according to claim 11 further comprising receiving, from the data source, a build material processing authorization.

17. A method according to claim 11 further comprising writing, to the data source, an indication that the data thereon has been read.

18. The data unit and additive manufacturing system of claim 1, further comprising an additive manufacturing apparatus comprising:

a first interface and second interface to receive data associated with a build material, wherein the first interface is to receive data from a first data source, and the second interface comprises the reader to receive data from the data source of the data unit; and a control module to control object generation based at least in part on the received data.

19. The additive manufacturing apparatus of claim 18 in which the control module is to determine which of the first and second interfaces is in communication with an available data source, and to receive data from an available data source.

20. The additive manufacturing system of claim 1 further comprising an additive manufacturing apparatus having a control module in which the control module is to:

prevent at least one operation of the additive manufacturing apparatus in the absence of a release code;

validate an available data source; and, if the data source is valid, generate a release code, wherein the release code is conditional on at least one of: an attribute of an object to be formed from the build material, and compatibility of the build material with the additive manufacturing apparatus.

21. The additive manufacturing apparatus of claim 20 in which the control module is to validate the data source by determining if the data source has previously been accessed by the additive manufacturing apparatus and, if so, determining that the data source is invalid, wherein the data source comprises a first data field to store a flag indicating that data of the data source has been previously accessed.

* * * * *